(12) United States Patent
Xu et al.

(10) Patent No.: US 11,621,749 B2
(45) Date of Patent: *Apr. 4, 2023

(54) SPATIAL AND FREQUENCY DIVERSITY DESIGN FOR MACHINE TYPE COMMUNICATIONS (MTC)

(71) Applicant: QUALCOMM Incorporated, San Diego, CA (US)

(72) Inventors: Hao Xu, Beijing (CN); Peter Gaal, San Diego, CA (US); Wanshi Chen, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/097,071

(22) Filed: Nov. 13, 2020

(65) Prior Publication Data

US 2021/0067213 A1 Mar. 4, 2021

Related U.S. Application Data

(63) Continuation of application No. 15/002,208, filed on Jan. 20, 2016, now Pat. No. 10,868,591.

(Continued)

(51) Int. Cl.
*H04B 7/02* (2018.01)
*H04B 7/0456* (2017.01)
(Continued)

(52) U.S. Cl.
CPC ............. *H04B 7/0456* (2013.01); *H04L 1/02* (2013.01); *H04W 4/70* (2018.02); *H04B 7/0669* (2013.01)

(58) Field of Classification Search
CPC .... H04B 7/0456; H04B 7/0669; H04B 7/068; H04B 7/12; H04B 7/0697; H04B 7/02;
(Continued)

(56) References Cited

U.S. PATENT DOCUMENTS 9,425,928 B2 8/2016 Guan et al.
9,548,845 B2 1/2017 Yi et al.
(Continued)

FOREIGN PATENT DOCUMENTS

EA 201791529 A1 12/2017
EP 2635082 A1 9/2013
(Continued)

OTHER PUBLICATIONS

Qualcomm Incorporated: "Link Level Simulation Results for D2D Broadcast Communication" [online], 3GPP Draft, 3GPP TSG-RAN WG1 #76BIS, R1-141447, Mar. 22, 2014, pp. 1-11, Retrieved from the Internet URL:http://www.3gpp.org/ftp/tsg_ran/WG1_RL1/TSGR1_76b/Docs/R1-141447.zip.

(Continued)

*Primary Examiner* — Frank Duong
(74) *Attorney, Agent, or Firm* — Patterson & Sheridan, LLP

(57) ABSTRACT

Certain aspects of the present disclosure generally relate to wireless communications, and more specifically to increased diversity for devices with limited communications resources. An example method generally includes transmitting data as a bundled transmission to a device with limited communications resources, the bundled transmission comprising multiple bursts wherein each burst spans a plurality of transmission time intervals (TTIs) and the same data is transmitted in each burst, and taking action to increase diversity (e.g., at least one of spatial diversity, time diversity, frequency diversity, etc.) for the bundled transmission.

26 Claims, 12 Drawing Sheets

Related U.S. Application Data

(60) Provisional application No. 62/184,189, filed on Jun. 24, 2015, provisional application No. 62/106,162, filed on Jan. 21, 2015.

(51) Int. Cl.
*H04W 4/70* (2018.01)
*H04L 1/02* (2006.01)
*H04B 7/06* (2006.01)

(58) Field of Classification Search
CPC ...... H04B 7/2656; H04W 4/005; H04W 4/08; H04W 4/14; H04W 28/0215; H04W 52/0216; H04W 4/70; H04W 74/006; H04L 1/0007; H04L 1/02; H04L 1/04; H04L 1/0618; H04L 1/0625; H04L 1/08; H04L 1/1854; H04L 5/0053; H04L 27/2602
See application file for complete search history.

(56) References Cited

U.S. PATENT DOCUMENTS

| | | | |
|---|---|---|---|
| 9,654,902 B2 | 5/2017 | Oh et al. | |
| 10,111,224 B2 | 10/2018 | Lee et al. | |
| 10,455,544 B2 | 10/2019 | Vajapeyam et al. | |
| 10,868,591 B2 | 12/2020 | Xu et al. | |
| 2012/0201329 A1* | 8/2012 | Zhang | H04L 1/1819 375/296 |
| 2013/0083753 A1 | 4/2013 | Lee et al. | |
| 2013/0308572 A1* | 11/2013 | Sayana | H04L 5/0023 370/329 |
| 2014/0098761 A1* | 4/2014 | Lee | H04W 72/042 370/329 |
| 2015/0071209 A1 | 3/2015 | Chae et al. | |
| 2015/0195069 A1* | 7/2015 | Yi | H04L 5/0053 370/329 |
| 2015/0237644 A1* | 8/2015 | Golitschek Edler von Elbwart | H04L 5/0094 370/329 |
| 2015/0245323 A1* | 8/2015 | You | H04W 72/042 370/329 |
| 2015/0280876 A1 | 10/2015 | You et al. | |
| 2016/0135170 A1 | 5/2016 | Chen et al. | |
| 2016/0227424 A1 | 8/2016 | Chen et al. | |
| 2016/0352405 A1 | 12/2016 | Challa et al. | |
| 2017/0027013 A1* | 1/2017 | Kim | H04W 76/28 |

FOREIGN PATENT DOCUMENTS

| | | |
|---|---|---|
| EP | 2922225 A1 | 9/2015 |
| JP | 2011519540 A | 7/2011 |
| JP | 2016503611 A | 2/2016 |
| JP | 2016528765 A | 9/2016 |
| KR | 20140071480 A | 6/2014 |
| WO | 2014077577 A1 | 5/2014 |
| WO | 2015005743 A1 | 1/2015 |
| WO | 2016121911 A1 | 8/2016 |

OTHER PUBLICATIONS

ETRI: "PUSCH Link Performance for Coverage Enhancement and Low Power Consumption", 3GPP TSG-RAN WG1 Meeting #79, R1-144917, Nov. 8, 2014, 5 Pages, URL: http://www.3gpp.org/ftp/tsg_ran/WG1_RL1/TSGR1_79/Docs/R1-144917.zip.
International Preliminary Report on Patentability—PCT/US2016/014255, The International Bureau of WIPO—Geneva, Switzerland, dated Aug. 3, 2017.
International Search Report and Written Opinion—PCT/US2016/014255—ISA/EPO—dated Mar. 16, 2016.

\* cited by examiner

SPATIAL AND FREQUENCY DIVERSITY DESIGN FOR MACHINE TYPE COMMUNICATIONS (MTC)

CROSS-REFERENCE TO RELATED APPLICATIONS

This application is a continuation of U.S. patent application Ser. No. 15/002,208, filed Jan. 20, 2016, which claims priority to U.S. Provisional Patent Application Ser. No. 62/106,162, entitled "Spatial and Frequency Diversity Design for Machine Type Communications (MTC)" and filed Jan. 21, 2015, and U.S. Provisional Patent Application Ser. No. 62/184,189, entitled "Spatial and Frequency Diversity Design for Machine Type Communications (MTC)" and filed Jun. 24, 2015, both of which are assigned to the assignee hereof and both of which are hereby incorporated by reference in their entirety.

BACKGROUND

I. Field of the Invention

Certain aspects of the present disclosure generally relate to wireless communications, and more specifically to increasing diversity for devices with limited communications resources.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus are provided herein for increasing diversity in machine-type communications.

Certain aspects of the present disclosure provide a method for wireless communications by a transmitting device. The method generally includes transmitting data as a bundled transmission to a device with limited communications resources, the bundled transmission comprising multiple bursts wherein each burst spans a plurality of transmission time intervals (TTIs) and the same data is transmitted in each burst, and taking action to increase diversity (e.g., at least one of spatial diversity, time diversity, or frequency diversity, etc.) for the bundled transmission.

Certain aspects of the present disclosure provide an apparatus for wireless communications by a transmitting device. The apparatus generally includes a transmitter configured to transmit data as a bundled transmission to a device with limited communications resources, the bundled transmission comprising multiple bursts wherein each burst spans a plurality of transmission time intervals (TTIs) and the same data is transmitted in each burst, and at least one processor configured to take action to increase diversity (e.g., at least one of spatial diversity, time diversity, or frequency diversity, etc.) for the bundled transmission.

Certain aspects of the present disclosure provide an apparatus for wireless communications by a transmitting device. The apparatus generally includes means for transmitting data as a bundled transmission to a device with limited communications resources, the bundled transmission comprising multiple bursts wherein each burst spans a plurality of transmission time intervals (TTIs) and the same data is transmitted in each burst, and means for taking action to increase diversity (e.g., at least one of spatial diversity, time diversity, or frequency diversity, etc.) for the bundled transmission.

Certain aspects of the present disclosure provide a computer-readable medium for wireless communications by a transmitting device. The computer-readable medium generally includes code that, when executed by one or more processors, causes the device to transmit data as a bundled transmission to a device with limited communications resources, the bundled transmission comprising multiple bursts wherein each burst spans a plurality of transmission time intervals (TTIs) and the same data is transmitted in each burst, and take action to increase diversity (e.g., at least one of spatial diversity, time diversity, or frequency diversity, etc.) for the bundled transmission.

Certain aspects of the present disclosure provide a method for wireless communications by a device having limited communications resources. The method generally includes receiving configuration information for increasing diversity (e.g., at least one of spatial diversity, time diversity, or frequency diversity, etc.) for a bundled transmission, the bundled transmission comprising multiple bursts wherein the same data is transmitted in each burst, and receiving and processing the bundled transmission in accordance with the configuration information.

Certain aspects of the present disclosure provide an apparatus for wireless communications by a device having limited communications resources. The apparatus generally includes a receiver configured to receive configuration information for increasing diversity (e.g., at least one of spatial diversity, time diversity, or frequency diversity, etc.) for a bundled transmission, the bundled transmission comprising multiple bursts wherein the same data is transmitted in each burst, and receive a bundled transmission; and at least one processor configured to process the bundled transmission in accordance with the configuration information.

Certain aspects of the present disclosure provide an apparatus for wireless communications by a device having limited communications resources. The apparatus generally includes means for receiving configuration information for increasing diversity (e.g., at least one of spatial diversity, time diversity, or frequency diversity, etc.) for a bundled transmission, the bundled transmission comprising multiple bursts wherein the same data is transmitted in each burst, and means for receiving and processing the bundled transmission in accordance with the configuration information.

Certain aspects of the present disclosure provide a computer-readable medium for wireless communications by a device having limited communications resources. The computer-readable medium generally includes code that, when executed by one or more processors, causes the device to receive configuration information for increasing diversity (e.g., at least one of spatial diversity, time diversity, or frequency diversity, etc.) for a bundled transmission, the bundled transmission comprising multiple bursts wherein the same data is transmitted in each burst, and receive and process the bundled transmission in accordance with the configuration information.

Numerous other aspects are provided including methods, apparatus, systems, computer program products, computer-readable medium, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for enhancing downlink coverage for certain user equipments (e.g., low cost, low data rate UEs).

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Figure 1:
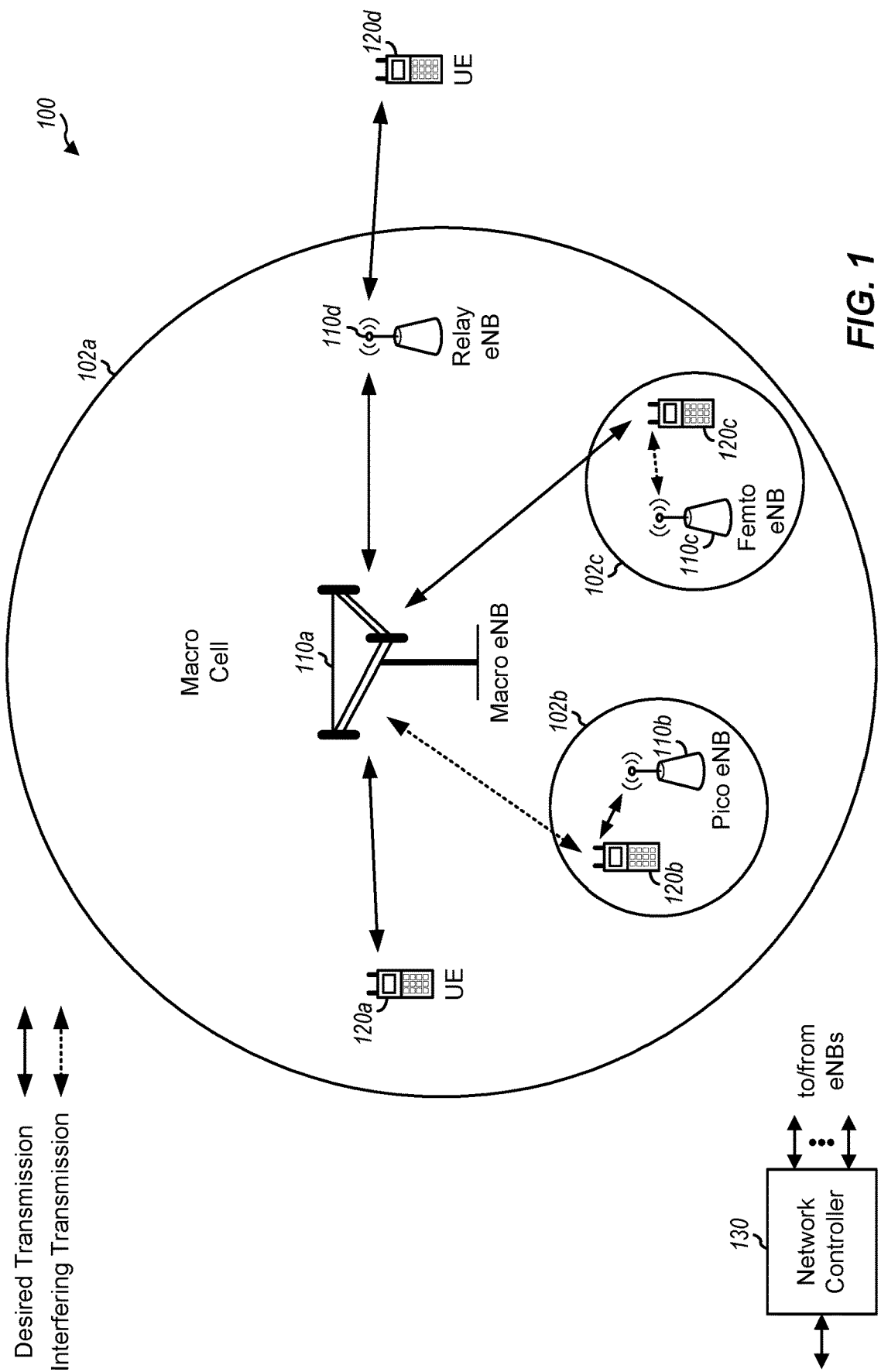
FIG. 1 is a block diagram conceptually illustrating an example wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, a wearable device (e.g., smart glasses, smart rings, smart bracelets, smart wristbands, smart clothing), health care/medical devices, vehicular devices, etc. UEs include MTC UEs, such as sensors, meters, monitors, location tags, drones, trackers, robots, etc. MTC UEs as well as other types of UEs may be implemented as NB-IoT (narrowband internet of things) devices. To enhance coverage of certain devices, such as MTC devices, "bundling" may be utilized in which certain transmissions are sent as a bundle of transmissions, for example, with the same information transmitted over multiple subframes.

Figure 2:
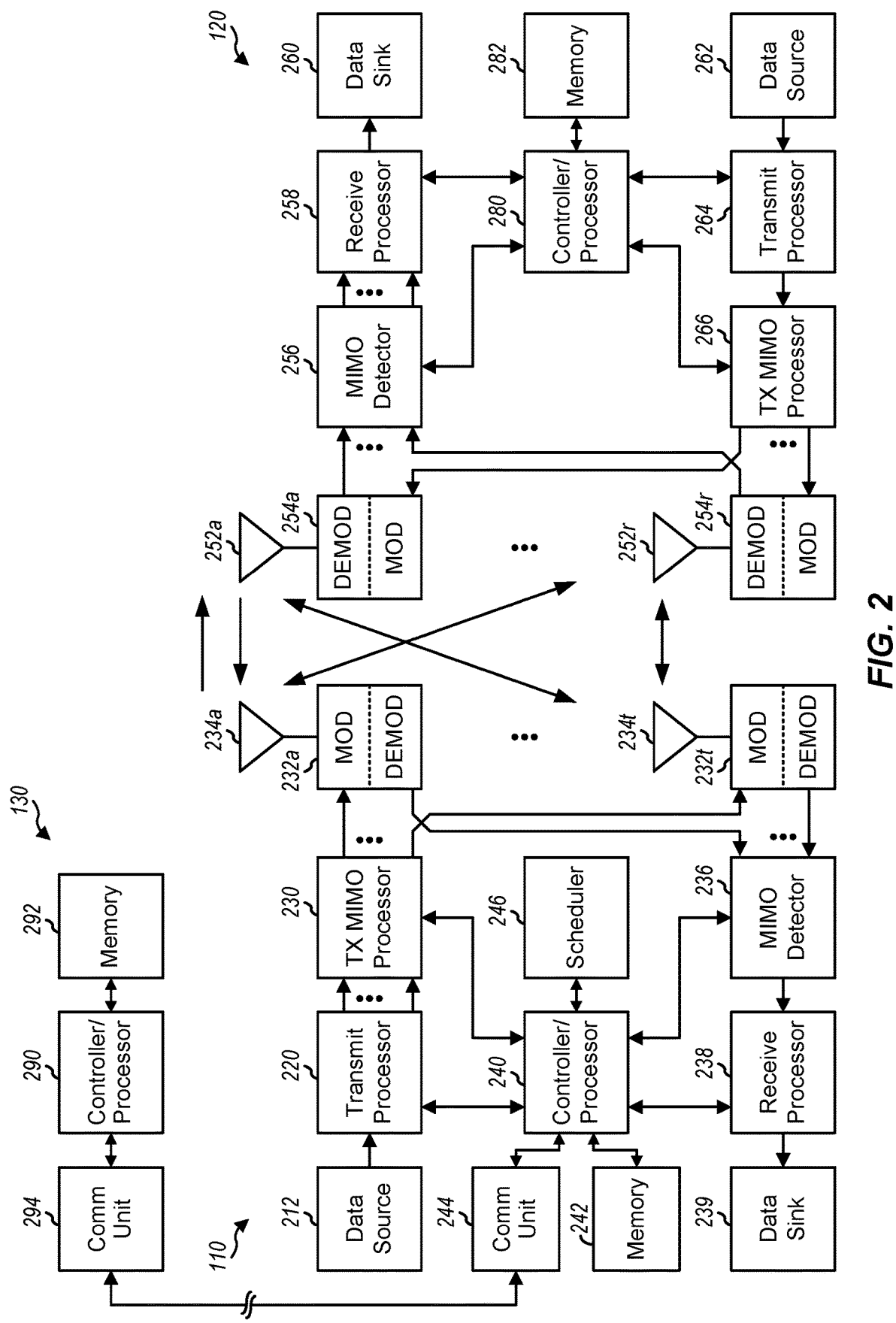
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254*a* through 254*r* (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein (e.g., operations with respect to FIGS. 5 and 6). Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
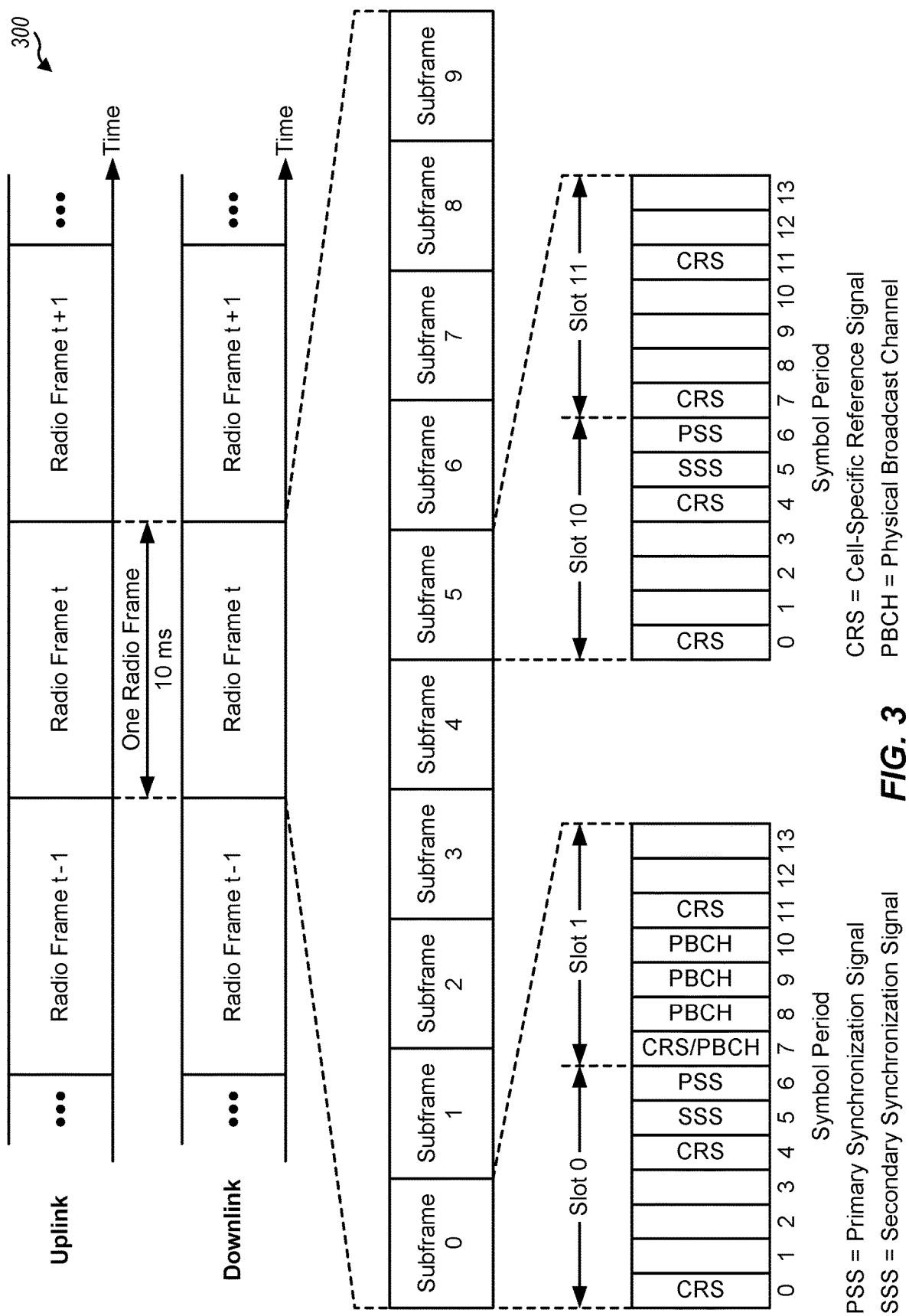
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
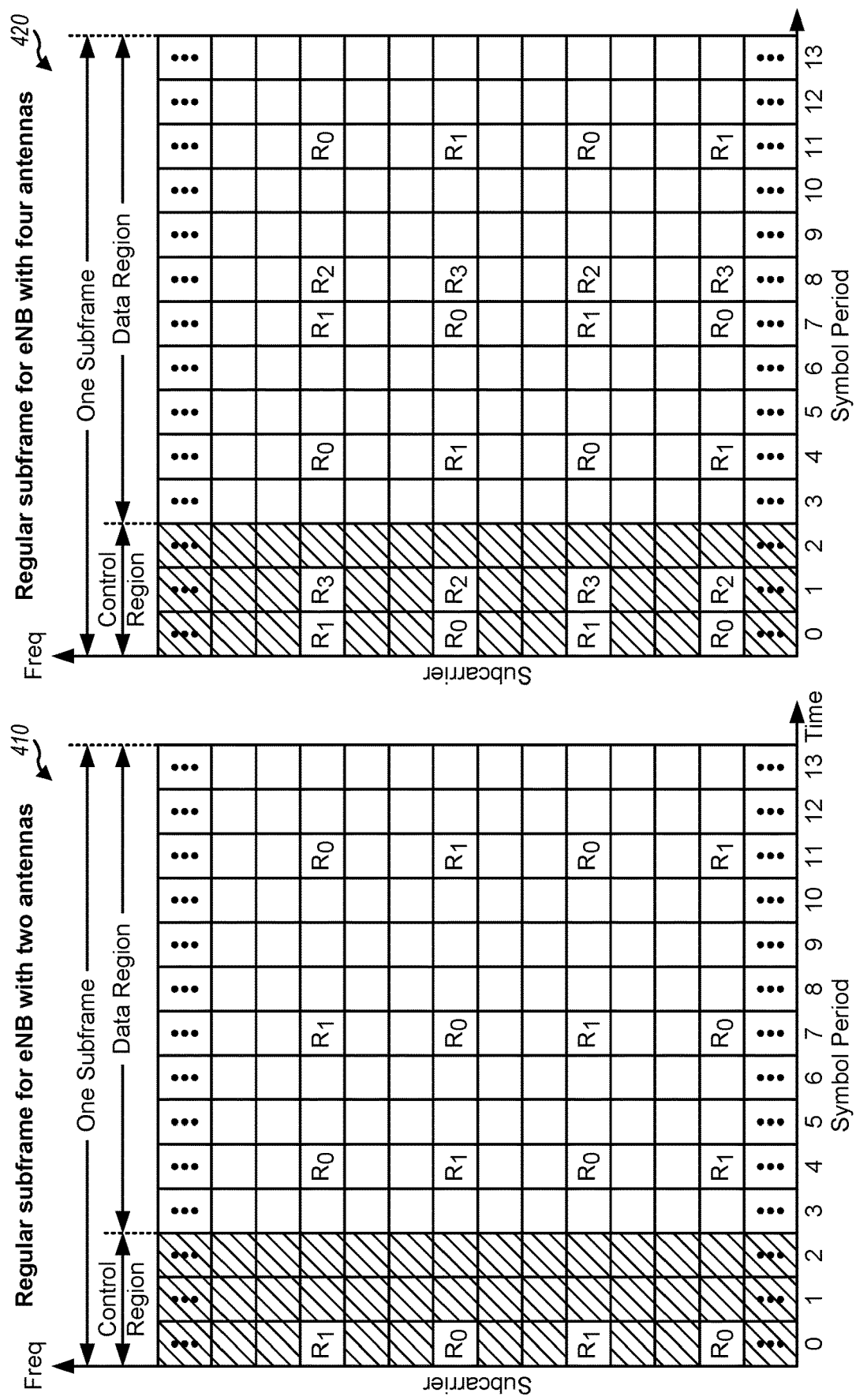
FIG. 4 illustrates an example subframe format for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

In certain systems (e.g., long term evolution (LTE) Release 8 or more recent), transmission time interval (TTI) bundling (e.g., subframe bundling) can be configured on a per-user equipment (UE) basis. TTI bundling may be configured by the parameter, ttiBundling, provided from higher layers. If TTI bundling is configured for a UE, the subframe bundling operation may only be applied to the uplink shared channel (UL-SCH), for example, physical uplink shared channel (PUSCH), and may not be applied to other uplink signals or traffic (e.g., such as uplink control information (UCI)). In some cases, TTI bundling size is fixed at four subframes (e.g., the PUSCH is transmitted in four consecutive subframes). The same hybrid automatic repeat request (HARQ) process number can be used in each of the bundled subframes. The resource allocation size may be restricted to up to three resource blocks (RBs) and the modulation order can be set to two (e.g., quadrature phase shift keying (QPSK)). A TTI bundle can be treated as a single resource for which a single grant and a single HARQ acknowledgement (ACK) is used for each bundle.

Devices having limited communications resources, such as machine type communications (MTC) devices, may have limited diversity. For example, a device having limited communications resources may have a single receiver, which may limit spatial diversity. These devices may also have limited or no mobility, which may limit time diversity. Additionally, these devices may be limited to a narrowband assignment (e.g., of no more than 6 resource blocks), which may limit frequency diversity.

For devices with a single receiver, successful communications may require increases in signal-to-noise ratio (SNR) requirements. For link budget limited devices, increases in SNR requirements for successful communications may entail the use of large bundling sizes.

Increasing diversity may increase the reliability of communications. Aspects of the present disclosure provide techniques for increasing frequency diversity, spatial diversity, and time diversity for devices with limited communications resources.

Figure 5:
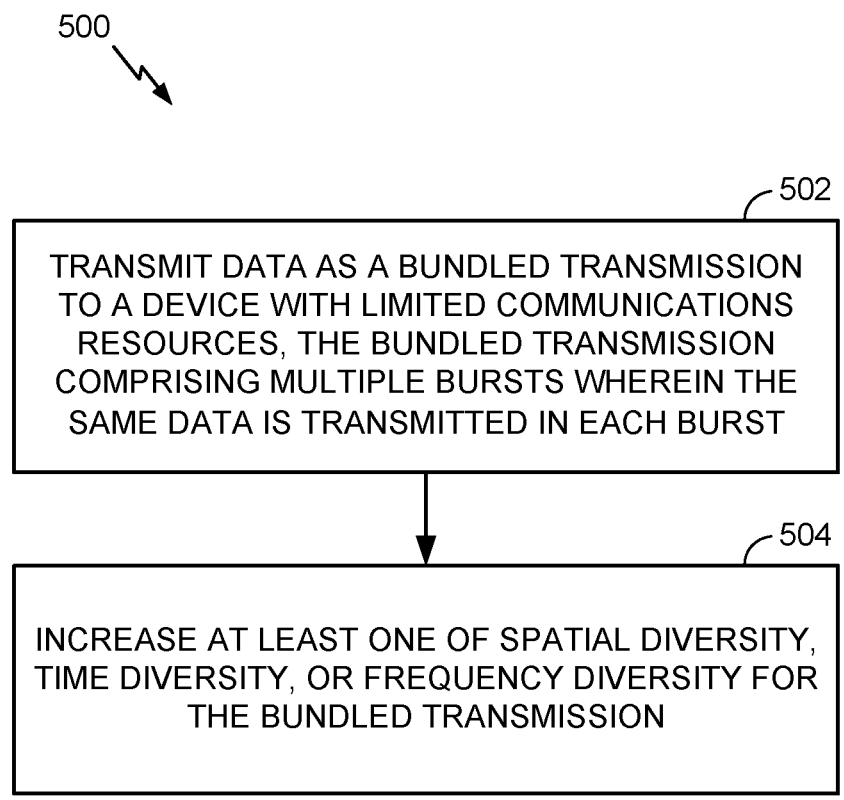
FIG. 5 illustrates example operations for a transmitting device, in accordance with certain aspects of the present disclosure.

FIG. 5 illustrates example operations 500 that may be performed by a transmitting device to increase diversity for transmissions to a device (e.g., a device with limited communications resources (e.g., MTC device, NB-IoT device)), according to aspects of the present disclosure. Operations 500 may begin at 502, where a transmitting device transmits data as a bundled transmission to a device with limited communications resources. The bundled transmission may comprise multiple bursts, and the same data may be transmitted in each burst. At 504, the transmitting device increases at least one of spatial diversity, time diversity, or frequency diversity for the bundled transmission.

Figure 6:
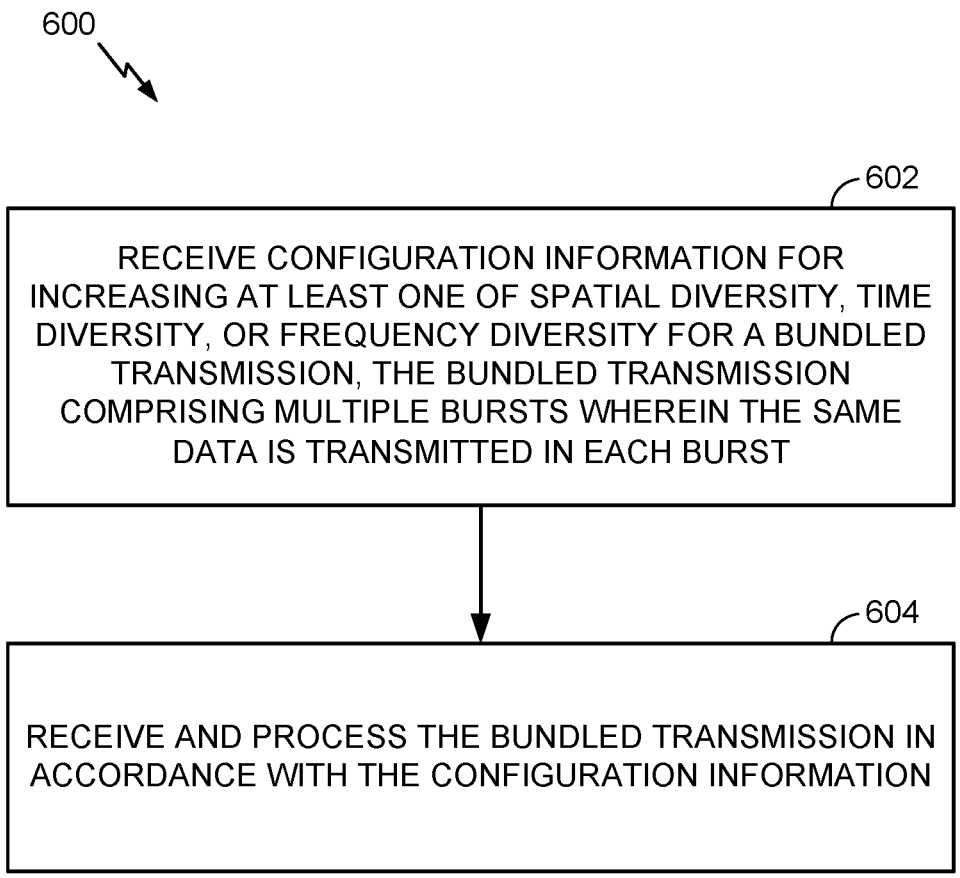
FIG. 6 illustrates example operations for a receiving device, in accordance with certain aspects of the present disclosure.

FIG. 6 illustrates example operations 600 that may be performed by a receiving device (e.g., a device with limited communications resources (e.g., MTC device, NB-IoT device)), according to aspects of the present disclosure. Operations 600 may begin at 602, where a receiving device receives configuration information for increasing at least one of spatial diversity, time diversity, or frequency diversity for a bundled transmission. The bundled transmission may comprise multiple bursts, and the same data may be transmitted in each burst. At 604, the receiving device may receive and process the bundled transmission in accordance with the configuration information.

In some aspects, increases in frequency diversity may be achieved by performing frequency hopping, or transmitting data to the same device using different frequency resources (e.g., different narrowbands of 6RBs). A burst may be sized to allow for sufficient channel estimation averaging, and gaps with a duration sufficient to allow for frequency retuning and/or time diversity may be introduced between bursts. As discussed below, different frequency hopping patterns may be used for communications for different MTC devices.

Figure 7:
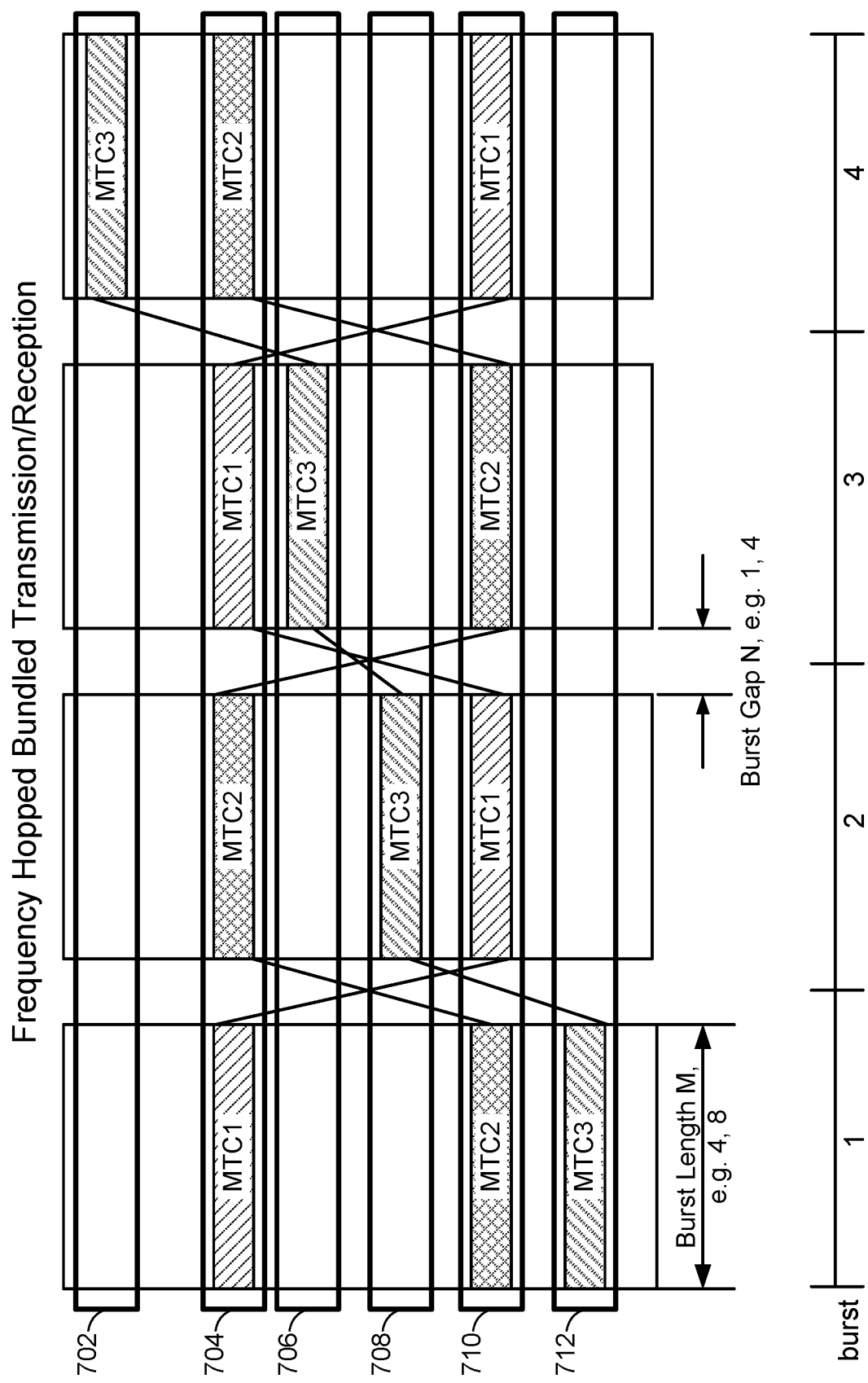
FIG. 7 illustrates an example of transmissions that may be performed by multiple devices, in accordance with certain aspects of the present disclosure.

FIG. 7 illustrates an example communication in which frequency diversity may be achieved for devices with limited communications resources, according to aspects of the present disclosure. As illustrated, the frequency at which an MTC device communicates may change periodically. For example, as illustrated by the communications for MTC1 and MTC2, bursts may be transmitted on alternating frequencies (a frequency hopping pattern using paired hopping between two bands). As illustrated, MTC1 may receive burst 1 on frequency band 704, and MTC2 may receive burst 1 on frequency band 710. After a burst gap (e.g., of at least one TTI) to allow MTC1 and MTC2 to retune to the appropriate frequency bands, MTC1 may receive burst 2 on frequency band 710, and MTC2 may receive burst 2 on frequency band 704. MTC1 and MTC2 may continue hop between receiving transmissions on frequency band 704 and frequency band 710, as illustrated in bursts 3 and 4.

In some aspects, as illustrated by the communications for MTC3, bursts need not be transmitted on alternating frequencies, which may allow for maximum diversity. For example, bursts may be transmitted on four different narrowbands, as illustrated by the communications for MTC3. As illustrated, MTC3 may receive burst 1 on frequency band 712, burst 2 on frequency band 708, burst 3 on frequency band 706, and burst 4 on frequency band 702. In some aspects, a burst may have a duration of 4 milliseconds or 8 milliseconds, and a gap duration may be 1 millisecond or 4 milliseconds.

In some aspects, the narrowbands used in paired hopping may be determined based on an identifier associated with each MTC device (e.g., MTC1 and MTC2). Frequency hopping may also be performed as a function of the cell ID, which may allow for randomization of inter-cell interference.

Figure 8:
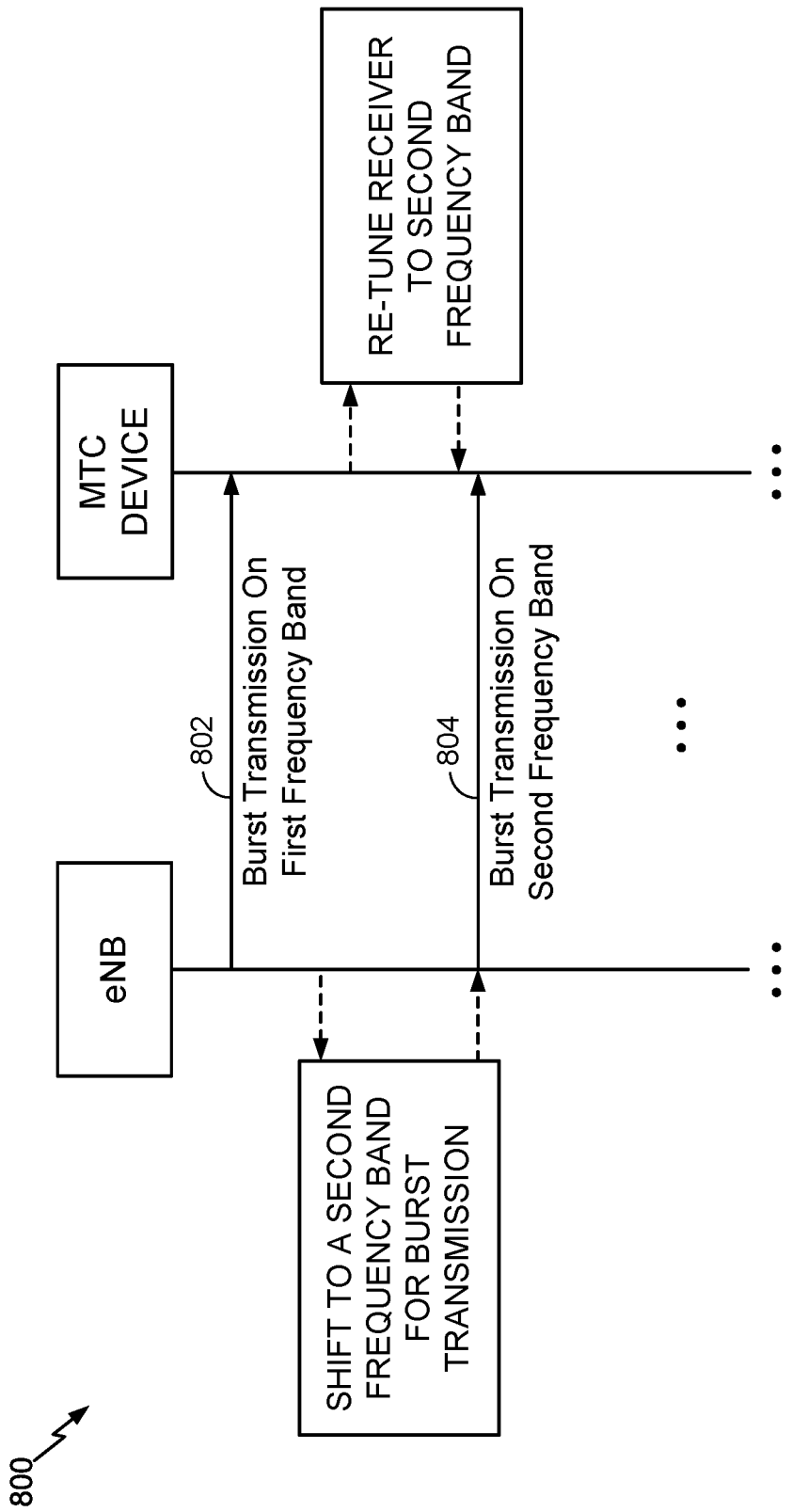
FIG. 8 illustrates an example call flow diagram illustrating messages that may be exchanged between an eNB and a UE using frequency hopping, in accordance with certain aspects of the present disclosure.

FIG. 8 illustrates an example call flow 800 showing messages that may be exchanged between an eNodeB and an MTC device, according to aspects of the present disclosure. The eNodeB may perform frequency hopping to achieve frequency diversity for devices with limited communications resources.

The eNodeB may perform a burst transmission 802 on a first frequency band. As discussed above, the burst transmission may be sized to allow for sufficient channel estimation averaging (e.g., a 4 millisecond or 8 millisecond burst). After the eNodeB performs burst transmission 802, the eNodeB pauses transmissions to allow the MTC device to retune a receiver at the MTC device to a second frequency band. Meanwhile, the eNodeB shifts a transmitter to a second frequency band to perform another burst transmission to the MTC device. The pause may be, for example, 1 millisecond in duration for a 4 millisecond burst, or 4 milliseconds in duration for an 8 millisecond burst. After the pause duration elapses, the eNodeB performs burst transmission 804 on the second frequency band. By transmitting bursts to an MTC device on different frequencies (e.g., narrowbands), a UE can achieve frequency diversity for devices with limited communications resources.

In some aspects, increased diversity may be realized through increasing spatial diversity. Spatial diversity may be achieved using, for example, precoding cycling across different bursts, space frequency block coding (SFBC), or cyclic delay diversity (CDD). For transmissions on the enhanced or evolved physical downlink control channel (ePDCCH), precoding cycling may be applied across different bursts. The same precoding may be used within a burst to allow for channel averaging. The type of precoding cycling applied to a transmission may be based, at least in part, on a type of channel transmitted in the bundled transmission. For transmissions on the enhanced or evolved physical downlink shared channel (ePDSCH), precoding cycling, SFBC, or CDD may be applied to achieve spatial diversity. If SFBC is used, paired resource elements may be needed. For large delay CDD, knowledge of the precoding codebook may be needed in order to decode the different bursts.

Figure 9:
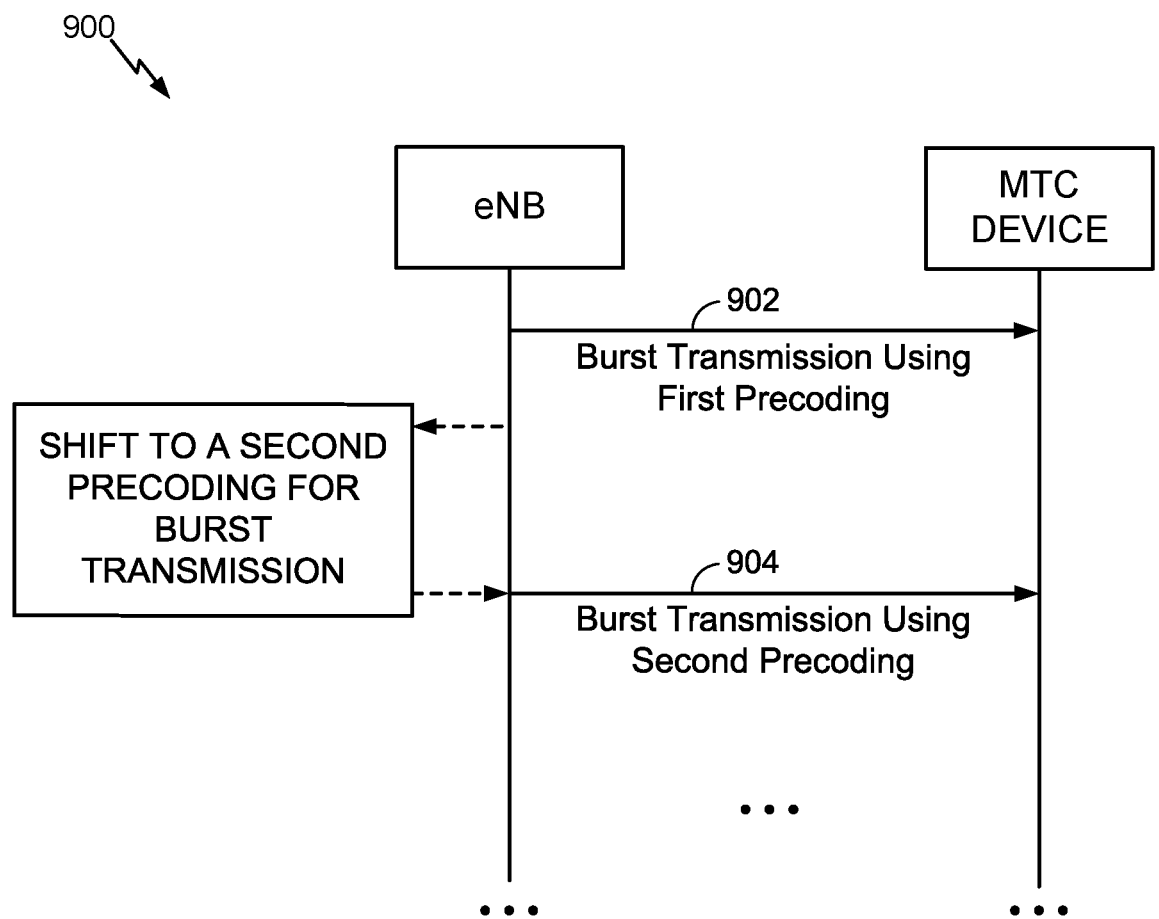
FIG. 9 illustrates an example call flow diagram illustrating messages that may be exchanged between an eNB and a UE using precoder cycling, in accordance with certain aspects of the present disclosure.

FIG. 9 illustrates an example call flow 900 showing messages that may be exchanged between an eNodeB and an MTC device, according to aspects of the present disclosure. As discussed above, the eNodeB may use precoding cycling to achieve spatial diversity for devices with limited communications resources.

The eNodeB may perform a burst transmission 902 using a first precoding (e.g., a first precoding matrix). As discussed above, the burst transmission may be sized to allow for sufficient channel estimation averaging (e.g., a 4 ms or 8 ms burst). After the eNodeB performs burst transmission 902, the eNodeB pauses transmissions to cycle to a second precoding. The pause may be, for example, 1 millisecond in duration for a 4 millisecond burst, or 4 millisecond in duration for an 8 millisecond burst. After the pause duration elapses, the eNodeB performs burst transmission 904 using the second precoding. By transmitting bursts to an MTC device using different precodings, an eNodeB can achieve spatial diversity for devices with limited communications resources.

Precoding cycling may entail the use of a mapping of at least two antenna ports to at least two beam directions. The at least two beam directions may be orthogonal. Different frequency tones may be mapped to different beam directions. For example, odd tones may be mapped to a first antenna port (mapped to a first beam direction), and even tones may be mapped to a second antenna port (mapped to a second beam direction).

In some cases, mapping of frequency tones to beam directions may be performed differently for different channels. For example, for ePDCCH, mapping frequency tones to different beam directions may be performed at the eREG (enhanced resource element group) level. For PDSCH, mapping frequency tones to different beam directions may be performed at the resource element level. In some cases, the precoding matrix may be known. If a UE is aware of the precoding, the UE can jointly process channel estimation from a CRS and from a DMRS.

Figure 10:
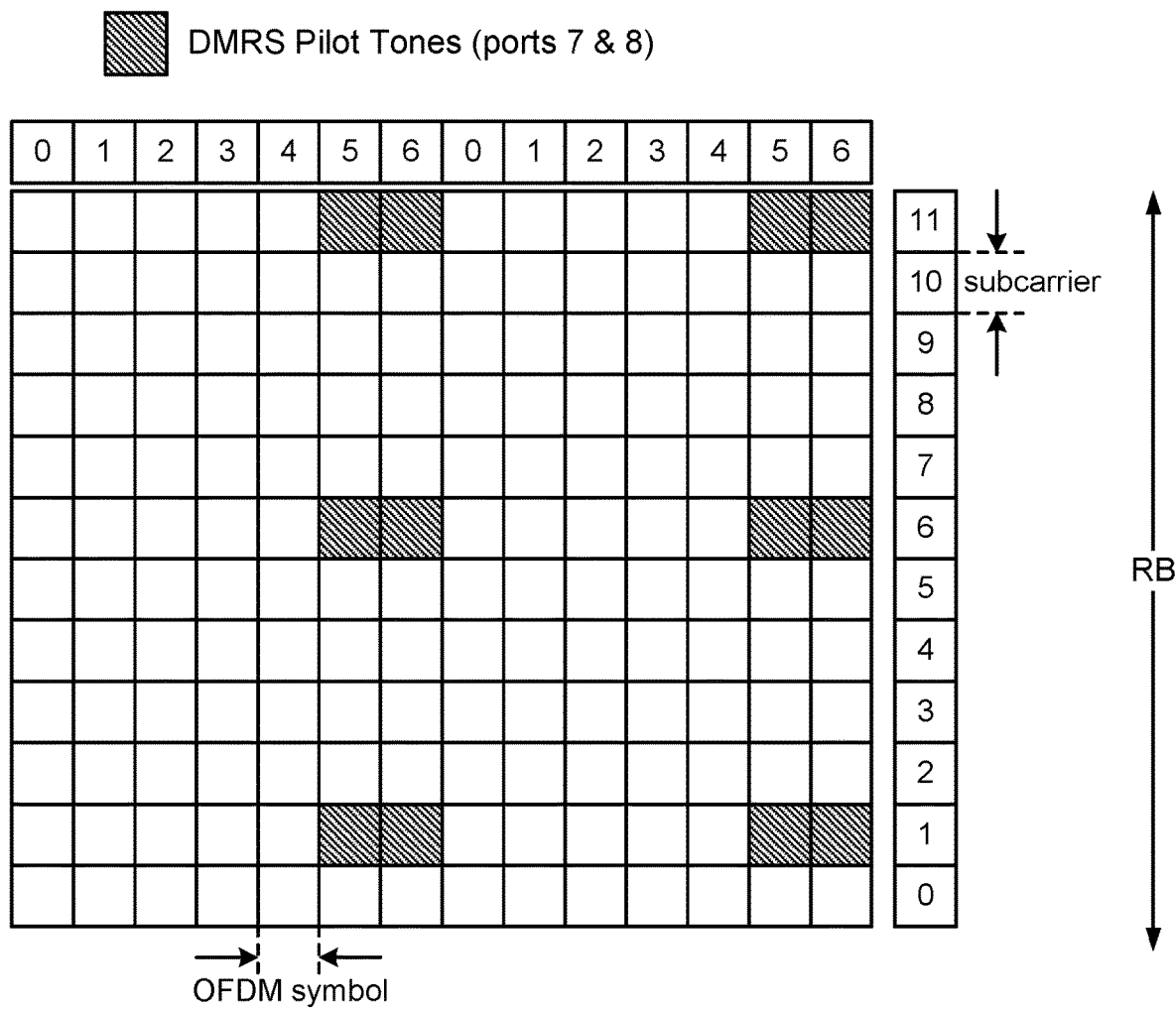
FIG. 10 illustrates an example precoder cycling on a per-resource element basis, in accordance with certain aspects of the present disclosure.
Figure 11:
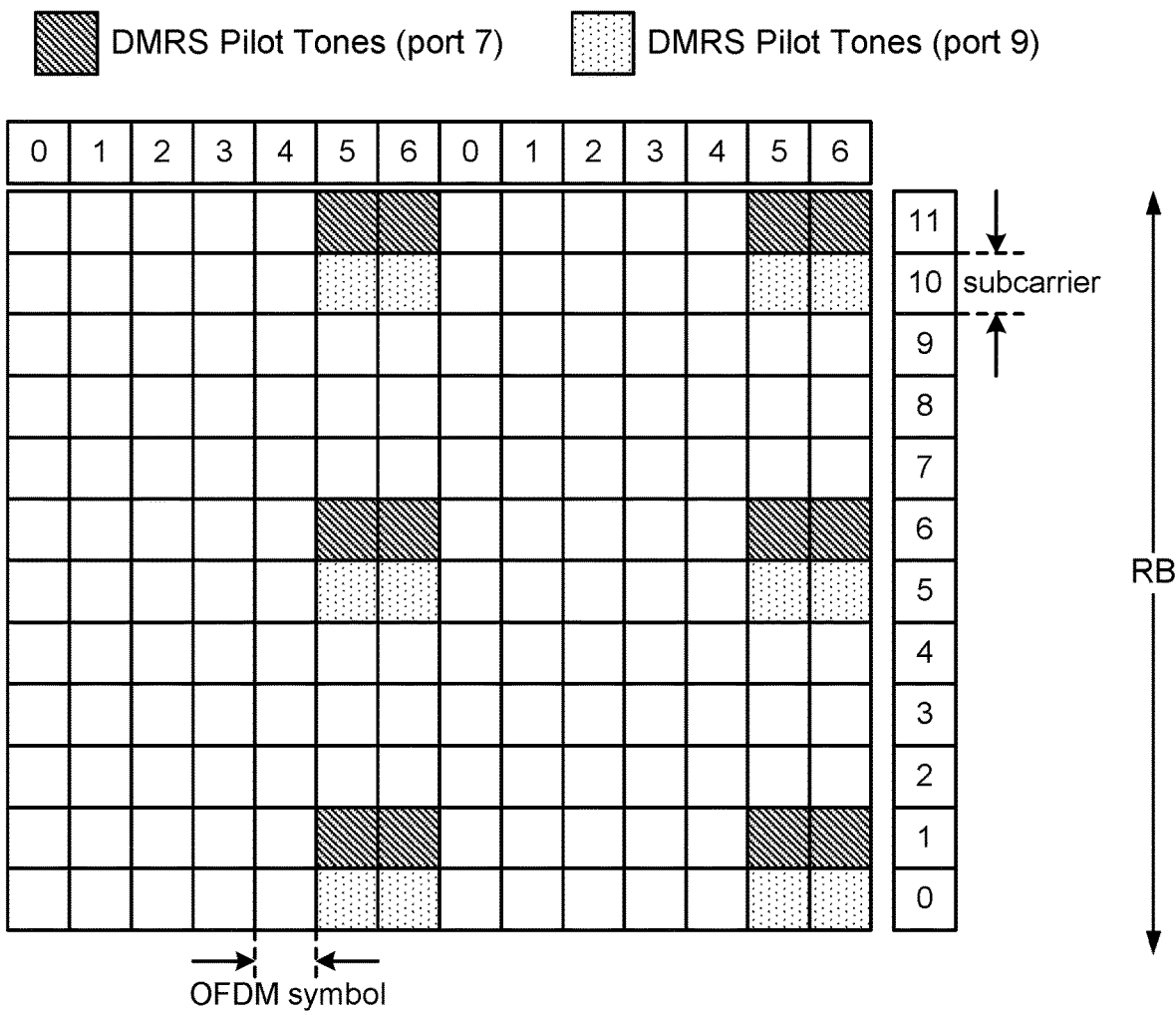
FIG. 11 illustrates an example precoder cycling on a per-resource element basis, in accordance with certain aspects of the present disclosure.

FIGS. 10 and 11 illustrate example schemes for PDSCH precoder cycling on a per-resource element basis, according to aspects of the present disclosure. As illustrated in FIG. 10, DMRS pilots may be transmitted on the same tones (e.g., 1, 6, and 11 as shown) for both a first and second antenna port. FIG. 11 illustrates another scheme for PDSCH precoder cycling on a per-resource element basis, in which DMRS pilots may be transmitted on a first set of resource elements (e.g., 1, 6, and 11 as shown) for a first antenna port and a second set of resource elements (e.g., 0, 5, and 10 as shown) for a second antenna port. In both schemes, data tones may be transmitted in the remaining resource elements.

In an aspect, transmission diversity on PDSCH may be achieved using precoding cycling with DMRS (demodulation reference signal)-based demodulation. Based on a HARQ bundle size of 8, a bundle burst may have a burst length of 7 subframes, with a gap of 1 subframe for radio frequency retuning. If less than 1 millisecond is needed for retuning (e.g., a retuning time of 0.5 ms, or the length of one slot), a bundle burst may have a length of between 7-8 subframes, and less than 1 subframe for retuning (e.g., 7.5 data subframes, and a 0.5 subframe gap for retuning). Larger bundle sizes as a multiple of 8 subframes may also be used, which may allow for multiplexing of multiple stations.

Transmission on PUSCH, which may have a receiver diversity of 2, may be performed according to the bundling technique used on PDSCH (e.g., bundle sizes as a multiple of 8 subframes, with a bundle burst length of ~7 subframes (e.g., 7 or 7.5 subframes) and a bundle gap of ~1 subframe (e.g., 0.5 or 1 subframe) for RF retuning). Additionally, for ePDCCH and PRACH, frequency hopping need not be implemented. For ePDCCH, transmissions may be of a limited size, and transmission diversity may be received by using precoding cycling with DMRS-based demodulation, as discussed above. For PRACH, which may have a receiver diversity of 2 and a small payload size, long bundling may not be needed.

Figure 12:
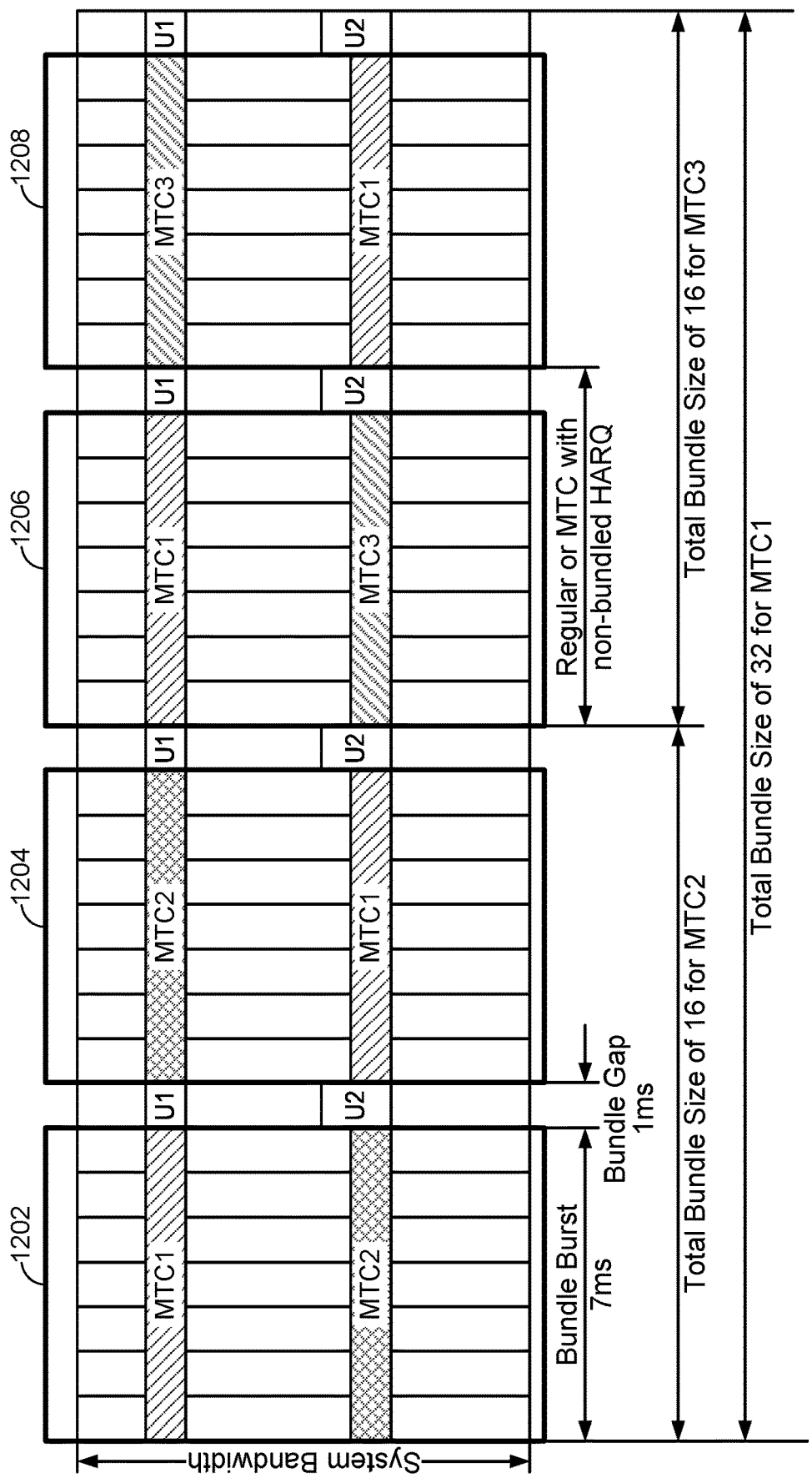
FIG. 12 illustrates an example of transmissions from multiple devices that may be multiplexed together, in accordance with certain aspects of the present disclosure.

FIG. 12 illustrates an example of multiplexing transmissions from multiple devices (e.g., with different bundle sizes). As illustrated, MTC1 may have a total bundle size of 32 (4 bursts), and MTC2 and MTC3 may both have a bundle size of 16 (2 bursts). Transmissions from MTC2 and MTC3 may be easily multiplexed with MTC1, and the frequency on which transmissions are performed may switch during the bundle gaps between bursts. For example, during bursts 1202 and 1204, transmissions from MTC1 and MTC2 may be multiplexed, and MTC1 and MTC2 may transmit on alternating frequency bands in bursts 1202 and 1204. During bursts 1206 and 1208, transmissions from MTC1 and MTC3 may be multiplexed. As with bursts 1202 and 1204, transmissions from MTC1 and MTC3 may be performed on alternating frequency bands in each burst. Multiplexing of transmissions may be performed between MTC devices and non-MTC devices (e.g., devices with using a larger bandwidth than a narrowband MTC device) based on a bundling size of multiples of 8.

In some cases (e.g., using a single local oscillator at an MTC device), retuning may be accomplished within 1 millisecond. Because the retuning may be accomplished within 1 millisecond, the resulting bundle length may be, for example, 7.5 subframes, with a retuning time of 0.5 milliseconds, as discussed above. Further, in LTE Release 12, the retuning time may be relaxed to 1 millisecond between downlink and uplink transmissions, and a 1 millisecond gap may be considered a minimum bundling gap for transitions between different bandwidth regions.

In some cases, bundled transmissions may be performed consecutively with a 1 millisecond gap. However, to allow for increasing time diversity, bundles may be transmitted with a burst length of 8 subframes and larger burst gaps (e.g., 4 milliseconds, 8 milliseconds, 16 milliseconds, etc.). The MTC device may tune from one frequency to another frequency during the burst gap. Larger burst sizes and burst gaps may result in longer awake times for a device. Discontinuous reception in between awake times may reduce power consumption but entail additional processing to handle transitions from awake to sleeping states.

Bundle burst length may have a default size of 4 of 8, which provides for a sufficient number of subframes to perform channel averaging. In some aspects, the bundle burst length may be a function of total bundle length (e.g., total bundle length versus a number of bursts to be transmitted). For example, with a default bundle burst length of 4 subframes, if 16 subframes are to be bundled, the 16 subframes may be bundled into four bundle bursts of four subframes. In another example, if 64 subframes are to be bundled, a the 64 subframes may be bundled into four bundle bursts of 16 subframes. In some cases, the bundle gap may also be considered in determining a number and size of the bundle burst length. For example, with a bundle burst length of 4 and a total of 16 subframes to be bundled, the bundle may be transmitted as four bursts of 3 subframes, plus a gap of 1 subframe.

In time division duplex, different uplink/downlink subframe configurations may follow a configuration of D (downlink), U (uplink), and S (special) subframes. Bundle burst length and the size of the burst gap may depend on the configuration of D and U subframes (e.g., consecutive D or U subframes). In some aspects, S subframes may be included as part of a bundle (since an S subframe has a downlink portion and an uplink portion). For example, in TDD configuration 1, which provides a subframe configuration of "DSUUDDSUUD", a downlink bundle burst may have a size of 2 subframes (consecutive D subframes), with a burst gap of 3 subframes. If S subframes are included in a bundle, a downlink bundle burst may have a size of 3 consecutive subframes (DDS), with a burst gap of 2 subframes. Similar bundle burst lengths and burst gap lengths may be implemented on the uplink. When bundling, whether using FDD or TDD, rate matching may be performed around a sounding reference signal (SRS) to avoid interfering with SRSs transmitted by other stations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
    transmitting data as a bundled transmission to a first type of device, the first type of device having more limited communications resources relative to a second type of device, wherein:
        the more limited communications resources comprise reduced bandwidth,
        the bundled transmission comprises multiple bursts,
        each burst spans a plurality of transmission time intervals (TTIs), and
        the same data is transmitted in each burst; and
    modifying spatial diversity by applying different precoding to different bursts in the bundled transmission, wherein a same precoding is used within a burst.

2. The method of claim 1, wherein each burst is transmitted in a bandwidth of no more than six resource blocks (RBs).

3. The method of claim 1, wherein a gap between bursts is determined based on a time sufficient for frequency retuning by the first type of device.

4. The method of claim 1, wherein a type of precoding for precoding cycling is dependent, at least in part, on a type of channel transmitted in the bundled transmission.

5. The method of claim 4, wherein for a physical downlink shared channel (PDSCH), the precoding cycling utilizes a mapping of at least two antenna ports to at least two beam directions.

6. The method of claim 1, wherein at least one of a burst length or modifying time diversity is based, at least in part, on maintaining a gap of at least one TTI between bursts.

7. The method of claim 1, wherein at least one of a burst length or a duration of a gap between bursts is dependent on an uplink/downlink subframe configuration.

8. The method of claim 7, wherein at least one of the burst length or the duration of the gap between bursts is dependent on a number of consecutive subframes of a same type.

9. The method of claim 1, wherein the bundled transmission to the first type of device is multiplexed with data transmitted as a bundled transmission to a second device, and wherein a bundle size used for the bundled transmission to the first type of device is different from a second bundle size used for the bundled transmission to the second device.

10. The method of claim 1, further comprising modifying time diversity by modifying a gap between different bursts in the bundled transmission.

11. An apparatus for wireless communications, comprising:
a transmitter configured to transmit data as a bundled transmission to a first type of device, the first type of device having more limited communications resources relative to a second type of device, wherein:
the more limited communications resources comprise reduced bandwidth,
the bundled transmission comprises multiple bursts, each burst spans a plurality of transmission time intervals (TTIs), and
the same data is transmitted in each burst;
at least one processor; and
memory coupled to the at least one processor, the memory comprising code executable by the at least one processor to configure the apparatus to modify spatial diversity by applying different precoding to different bursts in the bundled transmission, wherein a same precoding is used within a burst.

12. A method for wireless communications by a first type of device, the first type of device having more limited communications resources relative to a second type of device, comprising:
receiving configuration information for modifying spatial diversity for a bundled transmission, wherein:
different precoding to different bursts is applied in the bundled transmission,
a same precoding is used within a burst,
the bundled transmission comprises multiple bursts, and
the same data is transmitted in each burst; and
receiving and processing the bundled transmission in accordance with the configuration information, wherein the more limited communications resources comprise reduced bandwidth.

13. The method of claim 12, wherein each burst is received in a bandwidth of no more than six resource blocks (RBs).

14. The method of claim 12, wherein a gap between bursts is based on a time sufficient for frequency retuning by the first type of device.

15. The method of claim 12, wherein a type of precoding for precoding cycling is dependent, at least in part, on a type of channel received in the bundled transmission.

16. The method of claim 15, wherein, for a physical downlink shared channel (PDSCH), the precoding cycling utilizes a mapping of at least two antenna ports to at least two beam directions.

17. The method of claim 12, wherein a burst length comprises information indicating a gap of at least one transmission time interval (TTI) between bursts.

18. The method of claim 12, wherein at least one of a burst length or a duration of a gap between bursts is dependent on an uplink/downlink subframe configuration.

19. The method of claim 18, wherein at least one of the burst length or the duration of the gap between bursts is dependent on a number of consecutive subframes of a same type.

20. The method of claim 12, wherein the configuration information is further for modifying time diversity by modifying a gap between different bursts in the bundled transmission.

21. The method of claim 12, wherein the configuration information is further for modifying time diversity, and the configuration information for modifying time diversity comprises information indicating a gap of at least one transmission time interval (TTI) between bursts.

22. An apparatus for wireless communications by a first type of device, the first type of device having more limited communications resources relative to a second type of device, comprising:
a receiver configured to:
receive configuration information for modifying spatial diversity for a bundled transmission, wherein:
different precoding to different bursts is applied in the bundled transmission,
a same precoding is used within a burst,
the bundled transmission comprises multiple bursts, and
the same data is transmitted in each burst; and
receive the bundled transmission;
at least one processor; and
memory coupled to the at least one processor, the memory comprising code executable by the at least one processor to configure the apparatus to process the bundled transmission in accordance with the configuration information, wherein the more limited communications resources comprise reduced bandwidth.

23. An apparatus for wireless communications, comprising:
means for transmitting data as a bundled transmission to a first type of device, the first type of device having more limited communications resources relative to a second type of device, wherein:
the more limited communications resources comprise reduced bandwidth,
the bundled transmission comprises multiple bursts,
each burst spans a plurality of transmission time intervals (TTIs), and
the same data is transmitted in each burst; and
means for modifying spatial diversity by applying different precoding to different bursts in the bundled transmission, wherein a same precoding is used within a burst.

24. A non-transitory computer-readable medium for wireless communications by an apparatus, the computer-readable medium comprising code executable by at least one processor to cause the apparatus to:

transmit data as a bundled transmission to a first type of device, the first type of device having more limited communications resources relative to a second type of device, wherein:
the more limited communications resources comprise reduced bandwidth,
the bundled transmission comprises multiple bursts,
each burst spans a plurality of transmission time intervals (TTIs), and
the same data is transmitted in each burst; and
modify spatial diversity for the bundled transmission, by applying different precoding to different bursts in the bundled transmission, wherein a same precoding is used within a burst.

25. An apparatus for wireless communications by a first type of device, the first type of device having more limited communications resources relative to a second type of device, comprising:
means for receiving configuration information for modifying spatial diversity for a bundled transmission, wherein:
different precoding to different bursts is applied in the bundled transmission,
a same precoding is used within a burst,
the bundled transmission comprises multiple bursts, and
the same data is transmitted in each burst; and
means for receiving and processing the bundled transmission in accordance with the configuration information, wherein the more limited communications resources comprise reduced bandwidth.

26. A non-transitory computer-readable medium for wireless communications by a first type of device, the first type of device having more limited communications resources relative to a second type of device, the computer-readable medium comprising code executable by at least one processor to cause the first type of device to:
receive configuration information for modifying spatial diversity for a bundled transmission, wherein:
different precoding to different bursts is applied in the bundled transmission,
a same precoding is used within a burst,
the bundled transmission comprises multiple bursts, and
the same data is transmitted in each burst; and
receive and process the bundled transmission in accordance with the configuration information, wherein the more limited communications resources comprise reduced bandwidth.

* * * * *